(12) United States Patent
Takeuchi

(10) Patent No.: US 7,023,788 B2
(45) Date of Patent: Apr. 4, 2006

(54) OBJECTIVE LENS FOR OPTICAL DISCS

(75) Inventor: Shuichi Takeuchi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 168 days.

(21) Appl. No.: 10/790,835

(22) Filed: Mar. 3, 2004

(65) Prior Publication Data

US 2004/0174799 A1 Sep. 9, 2004

(30) Foreign Application Priority Data

Mar. 3, 2003 (JP) ............... 2003-055678

(51) Int. Cl.
*G11B 7/00* (2006.01)

(52) U.S. Cl. ............................... 369/112.08
(58) Field of Classification Search ............... None
See application file for complete search history.

(56) References Cited

U.S. PATENT DOCUMENTS

| | | | |
|---|---|---|---|
| 6,088,322 A | 7/2000 | Broome et al. | |
| 6,118,594 A | 9/2000 | Maruyama | |
| 6,191,889 B1 | 2/2001 | Maruyama | |
| 6,480,344 B1 | 11/2002 | Maruyama | |
| 6,594,222 B1 | 7/2003 | Maruyama | |
| 6,614,600 B1* | 9/2003 | Kojima ............... | 369/112.12 |
| 6,624,942 B1 | 9/2003 | Maruyama et al. | |
| 6,636,365 B1 | 10/2003 | Saito et al. | |
| 6,671,247 B1 | 12/2003 | Arai et al. | |
| 6,807,139 B1* | 10/2004 | Sakamoto ............... | 369/112.07 |
| 6,856,471 B1* | 2/2005 | Totsuka et al. ......... | 369/112.06 |
| 6,873,475 B1* | 3/2005 | Takeuchi .................. | 369/44.37 |
| 6,873,590 B1* | 3/2005 | Takeuchi et al. ........ | 369/112.08 |

FOREIGN PATENT DOCUMENTS

| | | |
|---|---|---|
| JP | 2001-216674 | 8/2001 |
| JP | 2001-249273 | 9/2001 |

* cited by examiner

Primary Examiner—Thang V. Tran
(74) Attorney, Agent, or Firm—Greenblum & Bernstein, P.L.C.

(57) ABSTRACT

An objective lens for two or more types of optical discs of different standards is provided. A surface of the objective lens is formed with a diffracting structure, and has an inner area including an optical axis and an outer area. The outer area is configured such that part of a first beam (having a first wavelength for a first optical disc of relatively lower data density) passed through the zones will be substantially in phase (within a prescribed phase difference) with part of the first beam that passed through the inner area. A convergence angle $\theta$ of part of the first beam incident on the outermost part of the inner area measured after emerging from the objective lens and a design numerical aperture $NA_{ref}$ for the first optical disc satisfy:

Figure 1:
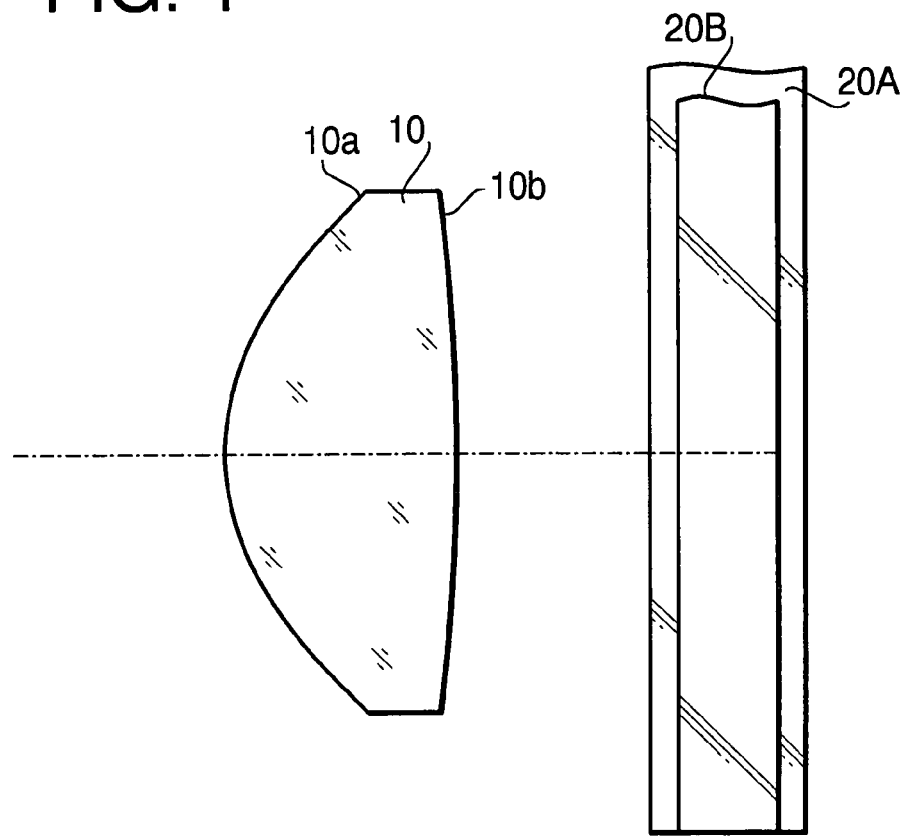

$$0.9 < \sin\theta / NA_{ref} < 1.0,$$

while the effective NA is substantially equal to the design numerical aperture $NA_{ref}$.

14 Claims, 2 Drawing Sheets

OBJECTIVE LENS FOR OPTICAL DISCS

BACKGROUND OF THE INVENTION

The present invention relates to an objective lens which is used for an optical disc drive capable of recording/reading data to/from two or more types of optical discs having different data densities and cover layer thicknesses.

There exist many types of optical discs according to various standards with different data densities and different thicknesses of the cover layer (protective layer). For instance, DVD (Digital Versatile Disc) has higher record density and a thinner cover layer than CD (Compact Disc). Therefore, when an optical disc loaded on an optical disc drive is replaced with another optical disc of a different type (standard), another effective beam diameter suitable for data density of the new disc has to be attained for reading/writing information while properly correcting spherical aberration which changes depending on the cover layer thickness.

For example, for realizing the information recording/readout on optical discs having high data density, a beam spot diameter has to be reduced by increasing an NA (numerical aperture) in comparison with an optical system specially employed for optical discs having low data density. Since the beam spot diameter gets smaller as the beam wavelength gets shorter, a laser light source emitting a laser beam having a wavelength of 635-665 nm has to be employed for optical systems for DVD, which is shorter than that (780–830 nm) of optical systems exclusively used for CD. Therefore, optical disc drives (optical information recording/readout devices) of recent years are provided with an optical system having a light source unit capable of emitting laser beams of different wavelengths.

In order for properly converging and focusing the laser beam on recording surfaces of optical discs having different cover layer thicknesses, an objective lens having a diffracting structure (which is partitioned into a plurality of annular zones by small level differences) on its one side is in practical use today for the optical systems for optical discs. Such an objective lens focuses the laser beam on the recording surface of the disc constantly with a proper NA even when optical discs of different standards are used, utilizing the characteristics of the diffracting structure causing different spherical aberrations depending on the wavelength of the incident beam.

The surface of such a conventional objective lens is divided into an inner area including the optical axis of the lens and an outer area outside the inner area. Typically, the inner area has diffracting structure capable of properly focusing the beam for the CD on the recording surface of the CD while also being capable of properly focusing the beam for the DVD on the recording surface of the DVD. Meanwhile, the outer area has diffracting structure capable of properly focusing the beam for the DVD on the recording surface of the DVD while being capable of preventing the proper focusing of the beam for the CD on the recording surface of the CD and thereby avoiding excessive convergence of the beam.

That is, part of the beam for the CD that passed through the outer area is diffused on the recording surface due to large spherical aberration caused by the diffracting structure, while only part of the beam for the CD that passed through the inner area is focused on the recording surface and forms a beam spot of a relatively large diameter. In the case of the beam for DVD, the NA becomes larger since part of the beam passing through the outer area also focuses on the recording surface, by which a small beam spot suitable for information recording/readout of DVD having high data density is formed on the recording surface.

Such a DVD/CD compatible objective lens and an optical information recording/readout device employing the DVD/CD compatible objective lens have been disclosed in Japanese Patent Provisional Publications No. P2001-216674A and P2001-249273A, for example.

In the case of writable optical discs such as CD-R and CD-RW, the diameter of the beam spot (on the recording surface) for writing is desired to be smaller than that for reading. The spot diameter can be reduced by using a beam of a short wavelength, setting the NA large, etc. However, the CD-R requires a long-wavelength beam of 780 nm or more due to reflection characteristics of its recording surface, therefore, the NA is set relatively large in order to realize the optimum spot size for recording the information onto the CD-R (RW). The large NA can be attained by, for example, increasing the effective diameter of the objective lens when optical discs of the CD standard are used, that is, by enlarging the inner area of the objective lens.

However, in the conventional DVD/CD compatible objective lens, the enlargement of the inner area for optimizing the information recording/readout of the CD-R (RW) might cause deterioration of wavelength characteristics or temperature characteristics when the beam for recording/readout of DVD is incident on the objective lens. Here, the "wavelength characteristics" of the objective lens means the extent of the change of spherical aberration when the wavelength of the incident beam changes. With deteriorated wavelength characteristics, even a slight change in the incident beam wavelength (due to individual differences of the light source, etc.) causes large spherical aberration. The "temperature characteristics" of the objective lens means the extent of the change of spherical aberration that is caused by the change of temperature. With deteriorated temperature characteristics, even a slight change in temperature (due to environmental variation, etc.) results in large spherical aberration.

In general, the permissible range of spherical aberration in reading/writing information becomes smaller as the data density of the optical disc increases. Therefore, the conventional DVD/CD compatible objective lens, designed to have a large inner area, has only a little margin for the permissible range, and thus further improvement of the wavelength characteristics and temperature characteristics has been desired.

SUMMARY OF THE INVENTION

The present invention is advantageous in that an improved objective lens for optical discs capable of reading/writing information from/to various types of optical discs having different cover layer thicknesses is provided. Specifically, there is provided an objective lens that is suitable for reading/writing information from/to optical discs having high data density and relatively thin cover layers while being also usable for writing information to optical discs having relatively thick cover layers.

In accordance with a first aspect of the present invention, there is provided an objective lens for converging a beam emitted by a light source on a recording surface of an optical disc, having compatibility with at least two types of optical discs of different data densities by employing diffracting structure having annular zones formed on at least one surface of the objective lens. The surface on which the diffracting structure is formed includes: an inner area which focuses the beam on the recording surface of each optical disc substantially with no aberration both when a first beam of a first wavelength for information recording/readout of a first optical disc is incident thereon and when a second beam of a second wavelength for information recording/readout of a second optical disc having data density relatively higher than that of the first optical disc is incident thereon; and an outer area which focuses the second beam on the recording surface of the second optical disc substantially with no aberration while forming a wavefront that is substantially continuous with a wavefront of part of the second beam that passed through the inner area.

The outer area includes at least one special annular zone which is formed so that part of the first beam that passed through the special annular zone will be substantially in phase (within a prescribed phase difference) with part of the first beam that passed through the inner area. A convergence angle θ [deg] of part of the first beam incident on the outermost part of the inner area measured after emerging from the objective lens and a design numerical aperture $NA_{ref}$ as an NA (Numerical Aperture) necessary for the information recording/readout of the first optical disc satisfy:

$$0.9 < \sin θ/NA_{ref} < 1.0 \qquad (1).$$

Further, an effective NA of the objective lens for the first beam is set substantially equal to the numerical aperture $NA_{ref}$.

The first optical disc corresponds to CD, CD-R, etc., and the second optical disc corresponds to DVD, etc., for example. By the composition of the objective lens as described above, the beam can be converged into a sufficiently small beam spot for recording information onto the first optical disc (having relatively low data density and a thick cover layer) while reducing the size (area) of the inner area which is necessary for attaining the compatibility with two or more types of optical discs. Therefore, a relatively large NA suitable for information recording to the first optical disc can be obtained while ensuring satisfactory wavelength characteristics and temperature characteristics for the second optical disc.

In accordance with another aspect of the present invention, there is provided an objective lens for converging a beam emitted by a light source on a recording surface of an optical disc, having compatibility with at least two types of optical discs of different data densities by employing diffracting structure having annular zones formed on at least one surface of the objective lens. The surface on which the diffracting structure is formed includes: an inner area which focuses the beam on the recording surface of each optical disc substantially with no aberration both when a first beam of a first wavelength suitable for information recording/readout of a first optical disc is incident thereon and when a second beam of a second wavelength suitable for information recording/readout of a second optical disc having data density relatively higher than that of the first optical disc is incident thereon; and an outer area which focuses the second beam on the recording surface of the second optical disc substantially with no aberration while forming a wavefront that is substantially continuous with a wavefront of part of the second beam that passed through the inner area. The objective lens is placed so that the first beam will be incident thereon as a parallel beam. The outer area includes at least one special annular zone which is formed so that part of the first beam that passed through the special annular zone will be substantially in phase with part of the first beam that passed through the inner area. Focal length f1 of the objective lens for the first wavelength, height H of the outermost part of the inner area measured from the optical axis of the objective lens, and a design numerical aperture $NA_{ref}$ as an NA (Numerical Aperture) necessary for the information recording/readout of the first optical disc satisfy:

$$0.9 < H/(f1 \cdot NA_{ref}) < 1.0 \qquad (2).$$

Further, an effective NA of the objective lens for the first beam is set substantially equal to the design numerical aperture $NA_{ref}$.

In the conditions (1) and (2), falling below the lower limit is undesirable since the light amount of the beam spot formed on the recording surface of the disc drops and thereby high-speed recording and high-precision optical pickup become impossible. Exceeding the upper limit is also undesirable since too large inner area deteriorates wavelength characteristics for the second optical disc, etc.

The aforementioned "substantially in phase" means that phase difference φ [deg] between the phase of the part of the first beam that passed through the special annular zone and the phase of the part of the first beam that passed through the inner area satisfies:

$$-90° < φ < +90° \qquad (3)$$

In the strictest sense, the "in phase" means that the phase difference φ is 0°; however, the condition (3) can be regarded as "substantially in phase" since center intensity of the beam spot is increased by the effect of the beam passing through the outer area and the spot on the recording surface is well focused when the condition (3) is satisfied. Phase differences φ out of the condition (3) are undesirable since the spot center intensity decreases and the spot gets too large. Such a state is called "substantially in antiphase" or "substantially in opposite phase".

Preferably, the "substantially in phase" may be defined by the following condition (4):

$$-60° \leq φ \leq +60° \qquad (4)$$

Specifically, a diameter W1 of a beam spot formed on the recording surface of the first optical disc by the first beam that passed through the objective lens and a beam spot diameter $W_{ref}$ obtained when an objective lens having an NA equal to the design numerical aperture $NA_{ref}$ is used satisfy:

$$0.99 < W1/W_{ref} < 1.01 \qquad (5)$$

Satisfying the condition (5) ensures that the effective NA of the objective lens for the first beam is substantially equal to the design numerical aperture $NA_{ref}$.

Preferably, at least one of the special annular zones satisfies the following condition regarding heights hmin and hmax of innermost and outermost parts of the special annular zone measured from the optical axis of the objective lens and height H of the outermost part of the inner area measured from the optical axis:

$$1.1 < (hmin + hmax)/2H < 1.25 \qquad (6)$$

By use of an objective lens satisfying the condition (6), intensity of "side lobes" occurring around the spot center can be reduced efficiently.

The objective lens in accordance with the present invention having the above characteristics is an objective lens suitable for writable first optical discs corresponding to a design numerical aperture $NA_{ref}$ of 0.50 or more. The objective lens of the present invention is suitable for optical information recording/readout devices in which information recording/readout of the second optical disc requires a large NA of 0.62 or more and the first optical discs also requires a relatively large NA.

BRIEF DESCRIPTION OF THE ACCOMPANYING DRAWINGS

Figure 2:
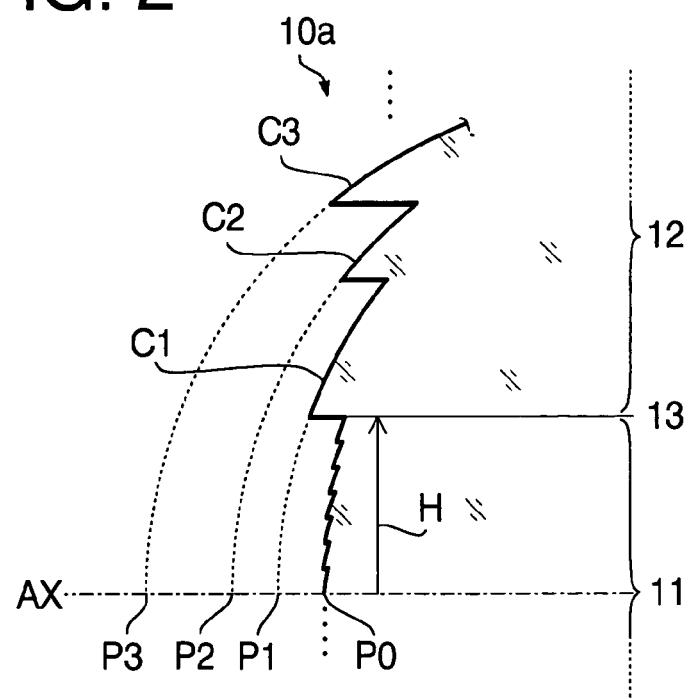
Figure 3:
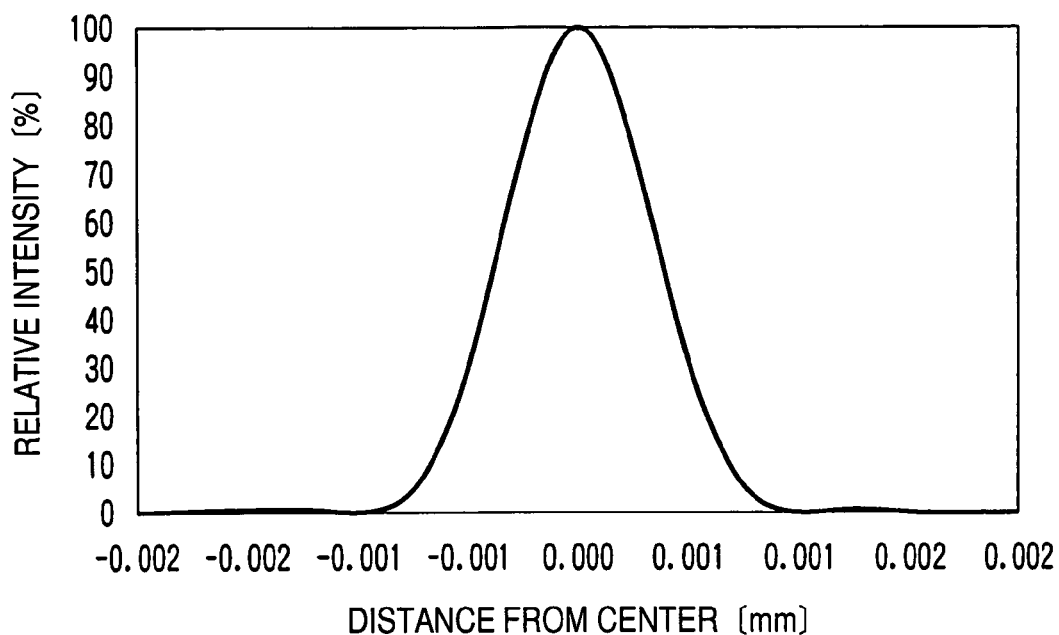
Figure 4:
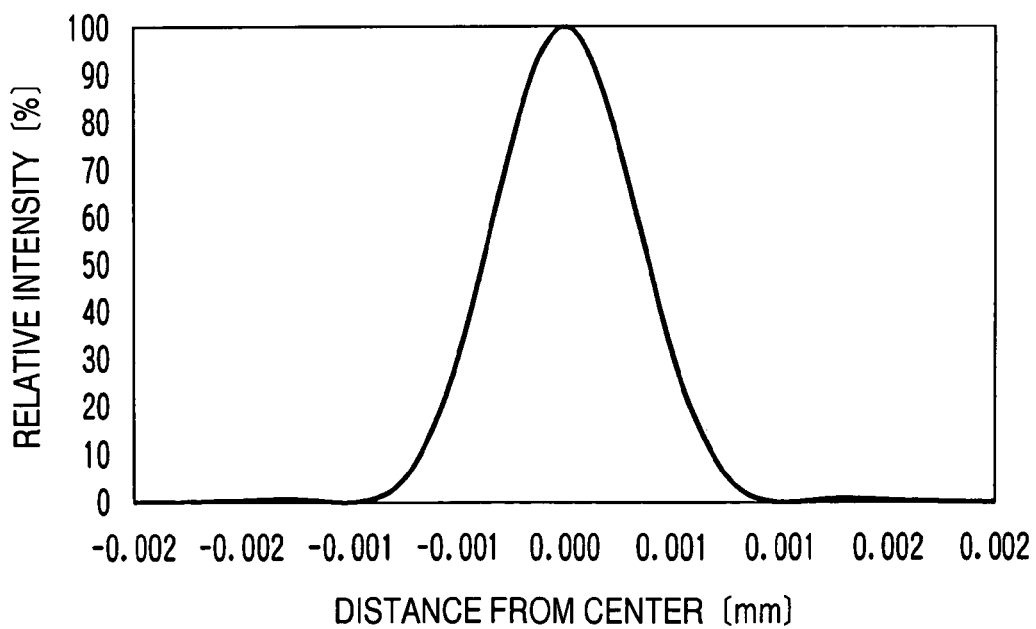

FIG. 1 schematically shows a cross-sectional view of an objective lens for optical discs in accordance with an embodiment of the present invention;

FIG. 2 is an enlarged cross-sectional view of a first surface of the objective lens of the embodiment taken along the optical axis of the lens;

FIG. 3 is a graph showing light intensity (relationship between light intensity and distance from spot center) of a beam spot formed on the recording surface of a first optical disc by focusing a first laser beam by use of an objective lens of a first example of the embodiment; and FIG. 4 is a graph showing light intensity (relationship between light intensity and distance from spot center) of a beam spot formed on the recording surface of a first optical disc by focusing a first laser beam by use of an objective lens of a second example of the embodiment.

DESCRIPTION OF THE EMBODIMENT

Referring now to the drawings, a description will be given in detail of a preferred embodiment in accordance with the present invention.

FIG. 1 schematically shows a cross-sectional view of an objective lens 10 for optical discs in accordance with an embodiment of the present invention and an optical disc (first optical disc 20A or second optical disc 20B). The objective lens 10 is installed in an optical information recording/readout device having compatibility with various types of optical discs of different data densities and cover layer thicknesses.

The optical disc 20A (20B) is set on an unshown turntable and thereby rotated at high speed for information recording/readout Incidentally, in this specification, an optical disc having a thick cover layer and low data density (CD, CD-R, etc.) will be referred to as "first optical disc 20A", while an optical disc having a thin cover layer and high data density (DVD, etc.) will be referred to as "second optical disc 20B".

For the information recording/readout on the first optical disc 20A, a laser beam having a relatively long wavelength (hereinafter referred to as "first laser beam") is emitted by a laser light source (unshown) to form a relatively large beam spot on the recording surface of the optical disc. Meanwhile, for the information recording/readout on the second optical disc 20B of high data density, a laser beam having a wavelength shorter than that of the first laser beam (hereinafter referred to as "second laser beam") is emitted by the laser light source to form a beam spot of a small diameter on the recording surface of the optical disc.

The laser beam emitted by the light source and collimated by a collimating lens (unshown) into a parallel beam is converged by the objective lens 10 in the vicinity of the recording surface of the optical disc 20A (20B). The objective lens 10 has a first surface 10a (on its light source side) and a second surface 10b (on its optical disc side). As shown in FIG. 1, the objective lens 10 is a biconvex single lens made of plastic, with the first and second surfaces 10a and 10b both formed aspherical.

As mentioned above, the cover layer thickness differs between the first optical disc 20A and the second optical disc 20B, and thus the spherical aberration changes depending on the type of the disc used. Therefore, in this embodiment, at least one surface of the objective lens 10 (first surface 10a) is provided with specific diffracting structure having a plurality of annular zones (separated by small level differences) centering around the optical axis of the lens.

FIG. 2 is an enlarged cross-sectional view of the first surface 10a of the objective lens 10 taken along the optical axis AX of the lens. The first surface 10a of the objective lens 10 has an inner area 11 around the optical axis AX and an outer area 12 around the inner area 11. Each of the inner area 11 and outer area 12 includes a plurality of annular zones separated by small level differences as mentioned above. Each level difference at each annular interface between two adjacent annular zones is a positive level differences, that is, the thickness of the objective lens 10 increases as the interface is crossed from inside to outside in a direction going away from the optical axis AX.

As schematically shown in FIG. 2, the diffracting structure in the inner area 11 of the first surface 10a is formed so that the first laser beam will be focused properly on the recording surface of the first optical disc 20A substantially with no aberration and the second laser beam will be focused properly on the recording surface of the second optical disc 20B substantially with no aberration.

The size of the inner area 11 is set to satisfy the following condition (1):

$$0.9 < \sin\theta/NA_{ref} < 1.0 \quad (1)$$

where "θ" [deg] denotes the angle between the optical axis AX and traveling direction of part of the first laser beam incident on the outermost part (periphery) 13 of the inner area 11 measured after emerging from the objective lens (hereinafter referred to as "convergence angle" for convenience), and "$NA_{ref}$" denotes NA (Numerical Aperture) necessary for the information recording/readout on the first optical disc 20A (hereinafter referred to as "design numerical aperture").

The conventional DVD/CD compatible objective lens (having the diffracting structure composed of the inner area and outer area) was designed to obtain the design numerical aperture for the first optical disc 20A from the inner area only, whereas the inner area 11 of the objective lens 10 of this embodiment (satisfying the condition (1)) is designed to be smaller than the area necessary for obtaining the design numerical aperture. In other words, the whole part of the beam passing through the inner area 11 is a little insufficient for obtaining the design numerical aperture for the first optical disc 20A.

As mentioned before, each laser beam incident on the objective lens 10 is a parallel light beam. Therefore, the above condition (1) can be rewritten as:

$$0.9 < H/(f1 \cdot NA_{ref}) < 1.0 \quad (2)$$

where "f1" denotes the focal length of the objective lens 10 for the first laser beam which is incident as a parallel beam, and "H" denotes the height of the periphery 13 of the inner area 11 measured from the optical axis AX.

Meanwhile, the diffracting structure formed in the outer area 12 includes a plurality of annular zones C1, C2, C3, . . . which are separated by the annular interfaces having level differences in the direction of the optical axis AX. The outer area 12 is a set of surfaces (annular zones) C1–Cn each of which is defined by individual aspherical coefficients. The diffracting structure of the outer area 12 is formed so that the second laser beam will be optimally focused on the recording surface of the second optical disc 20B. Specifically, the outer area 12 is designed so that the wavefront of part of the second laser beam that passed through the outer area 12 will be substantially continuous with the wavefront of part of the second laser beam that passed through the inner area 11. In other words, the outer area 12 is formed so that the phase of part of the second laser beam that passed through the outer area 12 will be substantially equal to the phase of part of the second laser beam that passed through the inner area 11. By such composition of the diffracting structure, the second laser beam, passing through the inner area 11 and the outer area 12 with a large NA, forms a small beam spot on the recording surface of the second optical disc 20B.

The diffracting structure in the outer area 12 is formed so that at least one of parts of the first laser beam that passed through the annular zones C1, C2, C3, . . . respectively will be substantially in phase with part of the first laser beam that passed through the inner area 11. Hereinafter, such an annular zone will be referred to as "special annular zone".

The term "substantially in phase" means that phase difference $\phi$ between the two phases satisfies the following condition (3) or preferably, the following condition (4). In other words, among the annular zones C1, C2, C3, . . . formed in the outer area 12, those satisfying the condition (3) (preferably, the condition (4)) are the aforementioned special annular zones.

$$-90° < \phi < +90° \tag{3}$$

$$-60° \leq \phi \leq +60° \tag{4}$$

Contribution of each annular zone to image formation can be expressed as $A \cdot \cos \phi$, where "A" stands for the intensity of the phase vector of the whole annular zone which is obtained from phase distribution for the imaging point ($A \geq 0$) and "$\phi$" stands for the direction of the phase vector (i.e. the phase difference). Thus, the contribution $A \cdot \cos \phi$ becomes positive when the phase difference $\phi$ at least satisfies the condition (3). In this case, central intensity of the beam spot increases due to the contribution of the part of the beam passing through the annular zone, by which an effect like a reduction of the beam spot diameter is achieved. The effect becomes more prominent when the phase difference $\phi$ satisfies the condition (4).

By use of the objective lens 10 having the above diffracting structure, the effective NA becomes substantially equal to the design numerical aperture $NA_{ref}$ not only in the information readout from the first optical disc 20A but also in the information recording to the first optical disc 20A.

The aforementioned effective NA can be evaluated from the diameter of the beam spot formed on the recording surface of the first optical disc 20A. Therefore, a condition where "the effective NA in the information recording/readout of the first optical disc 20A is substantially equal to the design numerical aperture $NA_{ref}$", is equivalent to a condition where the following condition (5) is satisfied:

$$0.99 < W1/W_{ref} < 1.01 \tag{5}$$

where "$W_{ref}$" denotes a beam spot diameter when an imaginary objective lens having NA equal to the design numerical aperture $NA_{ref}$ is used, and "W1" denotes the diameter of a beam spot formed on the recording surface of the first optical disc 20A by the first laser beam that passed through the objective lens 10.

Further, at least one of the special annular zones is formed to fulfill the following condition (6):

$$1.1 < (hmin+hmax)/2H < 1.25 \tag{6}$$

where "hmin" and "hmax" are the heights of innermost and outermost parts of the special annular zone measured from the optical axis AX. In addition to the aforementioned various effects of the diffracting structure of the objective lens of this embodiment, intensity of side lobes can be reduced by forming the objective lens 10 so that at least one special annular zone will fulfill the condition (6).

In the following, two concrete examples according to the embodiment of the present invention will be presented in detail. The examples are about objective lenses 10 having the compatibility with a first optical disc 20A (writable, with a cover layer 1.2 mm thick) and a second optical disc 20B (with a cover layer 0.6 mm thick).

EXAMPLE 1

FIG. 1 shows the sectional form of the objective lens 10 of the first example. A second example, which will be described later, also has a similar sectional form. Specific numerical configuration of the objective lens 10 of the first example is shown in the following Table 1.

TABLE 1

| Optical Disc | 20A | 20B |
|---|---|---|
| Design Wavelength | 785 nm | 655 nm |
| Central Thickness | 1.40 mm | |
| Focal Length | 2.42 mm | 2.40 mm |
| Design NA | 0.51 | 0.65 |

In the Table 1, the "design wavelength" is the wavelength that is most suitable for the recording/readout of the optical disc (20A, 20B). The numerical configuration shown in Table 1 applies also to the second example. The following Table 2 shows the height range (hmin–hmax [mm]) from the optical axis AX) of the inner area 11 and that of each annular zone formed in the outer area 12.

TABLE 2

| | | hmin ≤ h < hmax |
|---|---|---|
| Inner Area 11 | | 0.000 ≤ h < 1.112 |
| Outer Area 12 | Zone C1 | 1.112 ≤ h < 1.230 |
| | Zone C2 | 1.230 ≤ h < 1.300 |
| | Zone C3 | 1.300 ≤ h < 1.369 |
| | Zone C4 | 1.369 ≤ h < 1.386 |
| | Zone C5 | 1.386 ≤ h < 1.409 |
| | Zone C6 | 1.409 ≤ h < 1.426 |
| | Zone C7 | 1.426 ≤ h < 1.483 |
| | Zone C8 | 1.483 ≤ h < 1.494 |
| | Zone C9 | 1.494 ≤ h < 1.505 |
| | Zone C10 | 1.505 ≤ h < 1.546 |
| | Zone C11 | 1.546 ≤ h < 1.560 |

As shown in Table 2, the outer area 12 of the objective lens 10 of the first example includes eleven annular zones C1–C11. In Table 2, the value shown at "hmax" of the inner area 11 is the aforementioned height H of the periphery 13 of the inner area 11 measured from the optical axis AX.

The first surface 10a and second surface 10b of the objective lens 10 are aspherical surfaces. The shape of each aspherical surface is expressed by the following expression:

$$X(h) = \frac{Ch^2}{1 + \sqrt{1 - (K+1)C^2h^2}} + A_4 h^4 + A_6 h^6 + A_8 h^8 + A_{10} h^{10} + A_{12} h^{12}$$

where X(h) denotes a SAG amount X(h) (i.e., a distance measured from a tangential plane contacting the aspherical surface on the optical axis) of a point on the aspherical surface whose height from the optical axis is h, "C" denotes curvature of the aspherical surface on the optical axis (1/r), "K" denotes a cone constant, "$A_4$", "$A_6$", "$A_8$", "$A_{10}$" and "$A_{12}$" denote aspherical coefficients of fourth, sixth, eighth, tenth and twelfth orders.

The cone constants and aspherical coefficients specifying the aspherical shape of the first surface 10a will be shown in the following Table 3, while those specifying the aspherical shape of the second surface 10b will be shown in the following Table 4.

P1, P2, P3, . . . The notation "E-On" (n: integer) in Table 3 indicates "$\times 10^{-n}$". The same applies to the following tables.

The diffracting structure formed on the inner area 11 of the first surface 10a (surface number: 1) of the objective lens 10 can be expressed by the following optical path difference function φ(h).

$$\phi(h) = (P_2 h^2 + P_4 h^4 + P_6 h^6 + \ldots) \times m \times \lambda$$

The optical path difference function φ(h) indicates the difference of optical path length between an imaginary beam

TABLE 3

| First Surface | r | K | d_shift | A4 |
|---|---|---|---|---|
| Inner Area 11 | 1.49000 | −0.5000 | 0.00000 | −1.01720E−02 |
| C1 | 1.50117 | −0.5000 | −0.01333 | −2.82919E−03 |
| C2 | 1.50245 | −0.5000 | −0.01696 | −2.81694E−03 |
| C3 | 1.50330 | −0.5000 | −0.01938 | −2.80877E−03 |
| C4 | 1.50415 | −0.5000 | −0.02181 | −2.80060E−03 |
| C5 | 1.50458 | −0.5000 | −0.02302 | −2.79652E−03 |
| C6 | 1.50500 | −0.5000 | −0.02423 | −2.79243E−03 |
| C7 | 1.50585 | −0.5000 | −0.02665 | −2.78426E−03 |
| C8 | 1.50670 | −0.5000 | −0.02908 | −2.77609E−03 |
| C9 | 1.50713 | −0.5000 | −0.03029 | −2.77201E−03 |
| C10 | 1.50798 | −0.5000 | −0.03271 | −2.76384E−03 |
| C11 | 1.50883 | −0.5000 | −0.03513 | −2.75567E−03 |

| | A6 | A8 | A10 | A12 |
|---|---|---|---|---|
| Inner Area 11 | −1.89400E−03 | −3.93700E−04 | 2.49600E−04 | −1.73400E−04 |
| C1 | 1.42548E−03 | −1.67316E−03 | 1.05763E−03 | −3.17532E−04 |
| C2 | 1.41851E−03 | −1.66315E−03 | 1.05029E−03 | −3.14839E−04 |
| C3 | 1.41385E−03 | −1.65647E−03 | 1.04539E−03 | −3.13045E−04 |
| C4 | 1.40920E−03 | −1.64980E−03 | 1.04050E−03 | −3.11250E−04 |
| C5 | 1.40687E−03 | −1.64646E−03 | 1.03805E−03 | −3.10353E−04 |
| C6 | 1.40455E−03 | −1.64313E−03 | 1.03561E−03 | −3.09455E−04 |
| C7 | 1.39989E−03 | −1.63645E−03 | 1.03071E−03 | −3.07661E−04 |
| C8 | 1.39524E−03 | −1.62978E−03 | 1.02582E−03 | −3.05866E−04 |
| C9 | 1.39292E−03 | −1.62644E−03 | 1.02337E−03 | −3.04968E−04 |
| C10 | 1.38826E−03 | −1.61977E−03 | 1.01847E−03 | −3.03174E−04 |
| C11 | 1.38361E−03 | −1.61309E−03 | 1.01358E−03 | −3.01379E−04 |

TABLE 4

| | Second Surface |
|---|---|
| r | −6.55000 |
| K | 0.0000 |
| A4 | 2.01600E−02 |
| A6 | 4.02700E−03 |
| A8 | −6.69000E−03 |
| A10 | 2.13800E−03 |
| A12 | −2.50000E−04 |

As shown in Table 3, the objective lens 10 of the first example has eleven aspherical surfaces: annular zones C1–C11 separated by the annular interfaces having level differences. Each "d_shift" in Table 3 denotes the shift amount of each "surface top". The "surface top" means the top (leftmost point in FIG. 2) of each aspherical surface in its complete shape (dotted line shown in FIG. 2 extending from each annular zone C1, C2, C3, . . . ), that is, the intersection point (P1, P2, P3, . . . ) of each complete aspherical surface (dotted line) with the optical axis AX. Thus, the "shift amount of each surface top" means the distance between P0 (intersection point of the actual first surface 10a with the optical axis AX) and each surface top P1, P2, P3, . . . The notation "E-On" (n: integer) in Table 3 indicates "$\times 10^{-n}$". The same applies to the following tables.

which is assumed not to be diffracted by the diffracting structure (at the point on the diffracting surface (first surface 10a) with the height h from the optical axis) and a beam diffracted by the diffracting structure, in which "$P_2$", "$P_4$", "$P_6$" . . . are coefficients of second, fourth, sixth orders, etc. The optical path difference function coefficients $P_2$, $P_4$, $P_6$ . . . specifying the diffracting structure are shown in the following Table 5. The factor "m" denotes the order of the diffracted beam that is used (m=1 in this embodiment).

TABLE 5

| P2 | 1.2000 |
|---|---|
| P4 | −6.2380 |
| P6 | −1.2000 |
| P8 | 0.0000 |
| P10 | 0.0000 |
| P12 | 0.0000 |

The direction and intensity of the phase vector and the value (hmin+hmax)/2H regarding the condition (6) in each annular zone C1–C11 (in the outer area 12) will be shown in the following Table 6.

TABLE 6

| | Phase Vector | | |
| --- | --- | --- | --- |
| | Direction | Intensity | (hmin + hmax)/2H |
| C1 | 32 | 0.27 | 1.053 |
| C2 | 45 | 0.42 | 1.138 |
| C3 | 3 | 0.14 | 1.200 |
| C4 | 65 | 0.79 | 1.239 |
| C5 | −2 | 0.97 | 1.257 |
| C6 | −74 | 0.85 | 1.275 |
| C7 | −48 | 0.60 | 1.308 |
| C8 | −10 | 0.72 | 1.339 |
| C9 | −42 | 0.73 | 1.348 |
| C10 | 24 | 0.14 | 1.372 |
| C11 | 68 | 0.93 | 1.397 |

As shown in Table 6, in the objective lens 10 of the first example, annular zones C1–C3, C5 and C7–C10 are the special annular zones satisfying the condition (4). With the easier condition (3), all the annular zones C1–C11 can be regarded as the special annular zones. Therefore, the objective lens 10 of the first example is capable of forming a beam of a relatively large NA required for the information writing to the first optical disc 20A.

Among the special annular zones, annular zones C2–C4 also fulfill the condition (6). FIG. 3 is a graph showing light intensity of the beam spot formed by focusing the first laser beam on the recording surface of the first optical disc 20A by use of the objective lens 10 of the first example, in which the horizontal axis indicates distance [mm] from the center of the beam spot and the vertical axis indicates relative light intensity [%] compared to that (100) at the spot center. As seen in FIG. 3, the relative intensity of side lobes nearest to the spot center (approximately ±0.001 mm–±0.002 mm from the spot center) is almost 0 compared to the center intensity. Therefore, by use of the objective lens 10 of the first example, the intensity of side lobes, deteriorating SIN (Signal-to-Noise) ratio in the information recording/readout, can be reduced effectively as well as securing an NA suitable for the writable first optical disc 20A.

EXAMPLE 2

The specific numerical configuration, the functions specifying the aspherical shape of the second surface 10b, and the optical path difference function coefficients for the inner area 11 of the objective lens 10 of the second example are similar to those of the first example, and thus repeated description thereof is omitted for brevity. The following Table 7 shows the height range (hmin–hmax [mm]) from the optical axis AX) of the inner area 11 and that of each annular zone in the outer area 12 of the objective lens of the second example.

TABLE 7

| | | hmin ≦ h < hmax |
| --- | --- | --- |
| Inner Area 11 | | 0.000 ≦ h < 1.180 |
| Outer Area 12 | Zone C1 | 1.180 ≦ h < 1.280 |
| | Zone C2 | 1.280 ≦ h < 1.342 |
| | Zone C3 | 1.342 ≦ h < 1.406 |
| | Zone C4 | 1.406 ≦ h < 1.474 |
| | Zone C5 | 1.474 ≦ h < 1.502 |
| | Zone C6 | 1.502 ≦ h < 1.545 |
| | Zone C7 | 1.545 ≦ h < 1.560 |

As shown in Table 7, the outer area 12 of the objective lens 10 of the second example includes seven annular zones C1–C7. In Table 7, the value shown at "hmax" of the inner area 11 is the aforementioned height H of the periphery 13 of the inner area 11 measured from the optical axis AX. The cone constants and aspherical coefficients specifying the aspherical shape of the first surface 10a of the objective lens 10 of the second example will be shown in the following Table 8.

TABLE 8

| First Surface | r | K | d_shift | A4 |
| --- | --- | --- | --- | --- |
| Inner Area 11 | 1.49000 | −0.5000 | 0.00000 | −1.01720E−02 |
| C1 | 1.50160 | −0.5000 | −0.01454 | −2.82511E−03 |
| C2 | 1.50287 | −0.5000 | −0.01817 | −2.81285E−03 |
| C3 | 1.50415 | −0.5000 | −0.02181 | −2.80060E−03 |
| C4 | 1.50543 | −0.5000 | −0.02544 | −2.78835E−03 |
| C5 | 1.50670 | −0.5000 | −0.02908 | −2.77609E−03 |
| C6 | 1.50798 | −0.5000 | −0.03271 | −2.76384E−03 |
| C7 | 1.50883 | −0.5000 | −0.03513 | −2.75567E−03 |
| | A6 | A8 | A10 | A12 |
| Inner Area 11 | −1.89400E−03 | −3.93700E−04 | 2.49600E−04 | −1.73400E−04 |
| C1 | 1.42316E−03 | −1.66982E−03 | 1.05518E−03 | −3.16634E−04 |
| C2 | 1.41618E−03 | −1.65981E−03 | 1.04784E−03 | −3.13942E−04 |
| C3 | 1.40920E−03 | −1.64980E−03 | 1.04050E−03 | −3.11250E−04 |
| C4 | 1.40222E−03 | −1.63979E−03 | 1.03316E−03 | −3.08558E−04 |
| C5 | 1.39524E−03 | −1.62978E−03 | 1.02582E−03 | −3.05866E−04 |
| C6 | 1.38826E−03 | −1.61977E−03 | 1.01847E−03 | −3.03174E−04 |
| C7 | 1.38361E−03 | −1.61309E−03 | 1.01358E−03 | −3.01379E−04 |

The direction and intensity of the phase vector and the value (hmin+hmax)/2H regarding the condition (6) in each annular zone C1–C7 of the objective lens 10 of the second example will be shown in the following Table 9.

TABLE 9

| | Phase Vector | | |
| --- | --- | --- | --- |
| | Direction | Intensity | (hmin + hmax)/2H |
| C1 | −118 | 0.34 | 1.042 |
| C2 | −112 | 0.38 | 1.111 |
| C3 | −102 | 0.26 | 1.164 |
| C4 | −4 | 0.93 | 1.220 |

TABLE 9-continued

| | Phase Vector | | |
|---|---|---|---|
| | Direction | Intensity | (hmin + hmax)/2H |
| C5 | −7 | 0.89 | 1.261 |
| C6 | 42 | 0.28 | 1.291 |
| C7 | 73 | 0.96 | 1.316 |

As shown in Table 9, in the objective lens 10 of the second example, annular zones C4–C6 are the special annular zones satisfying the condition (4). With the easier condition (3), C7 is also a special annular zone. Therefore, the objective lens 10 of the second example is also capable of forming a beam of a relatively large NA required for the information writing to the first optical disc 20A.

Among the special annular zones, the annular zone C4 also fulfills the condition (6). FIG. 4 is a graph showing light intensity of the beam spot formed by focusing the first laser beam on the recording surface of the first optical disc 20A by use of the objective lens 10 of the second example. As seen in FIG. 4, the objective lens 10 of the second example also has the side lobe intensity reduction effect similarly to the first example.

The objective lenses 10 of the above examples are compared with conventional objective lenses in the following table 10. In table 10, "CONVENTIONAL #1" denotes an ordinary objective lens whose design numerical aperture for CD is 0.51, and "CONVENTIONAL #2" denotes a DVD/CD compatible objective lens whose design numerical aperture for DVD is 0.65 (H=1.23 [mm]).

TABLE 10

| | Ex. #1 | Ex. #2 | Conv. #1 | Conv. #2 | |
|---|---|---|---|---|---|
| $\sin\theta/NA_{ref}$ | 0.913 | 0.970 | | | cond. (1) |
| $H/(f1 \cdot NA_{ref})$ | 0.901 | 0.956 | | | cond. (2) |
| Spot diameter ($1/e^2$) | 0.996 | 1.006 | 1.000 | | cond. (5) |
| Central Intensity | 0.905 | 0.931 | 1.000 | | |
| Spot Intensity | 0.895 | 0.935 | 1.000 | | |
| wavelength Characteristics ($\lambda$ rms/10 nm) | 0.021 | 0.021 | | 0.022 | |
| Temperature Characteristics ($\lambda$ rms/50° C.) | 0.031 | 0.038 | | 0.047 | |

As shown in Table 10, the objective lens 10 of the first and second examples satisfy both the conditions (1) and (2). The first and second examples also satisfy the condition (5). In other words, in the first and second examples, the periphery 13 of the inner area 11 is set nearer to the optical axis AX than a position corresponding to the design numerical aperture for CD. In other words, the size of the inner area 11 for realizing the compatibility with the first and second optical discs 20A and 20B is designed smaller. The insufficient NA of the inner area 11 is complemented by the effects of the special annular zones of the outer area 12, by which the effective NA of the objective lens is set substantially equal to the design numerical aperture. Therefore, a beam spot of a diameter substantially equal to that by the objective lens of CONVENTIONAL #1 can be formed on the recording surface of the first optical disc 20A. Further, as is clear from Table 10, the above composition of the first and second examples attains better wavelength characteristics and temperature characteristics than those of the DVD/CD compatible objective lens of CONVENTIONAL #2 when the second optical disc 20B is used.

The spot intensity of the first and second examples is slightly lower than that of CONVENTIONAL #1 as shown in Table 10; however, such slight deterioration of spot intensity has little effect on the information recording/readout processes, and thus the objective lenses 10 of the present invention can satisfactorily be implemented in optical information recording/readout devices with no problem.

While the objective lens 10 in accordance with the embodiment of the present invention has been described taking the above particular examples, the embodiment is not limited to the particular numerical configurations of the above examples. For example, it is also possible to provide the diffracting structure to the second surface 10b (not to the first surface 10a) or to both the first and second surfaces 10a and 10b.

Further, the design numerical apertures shown in Table 1 are only examples. In the objective lens 10 of the present invention, any relatively large NA necessary for the writable first optical disc 20A (0.50 or more) can be employed as the design numerical aperture for the first optical disc 20A. Similarly, any large NA necessary for the second optical disc 20B (0.62 or more) can be employed as the design numerical aperture for the second optical disc 20B.

As described above, in the objective lens in accordance with the embodiment of the present invention, a beam with an NA suitable for information recording/readout of writable optical discs having relatively thick cover layers can be formed while maintaining satisfactory wavelength characteristics and temperature characteristics for optical discs having thin cover layers and high data density.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The present disclosure relates to the subject matter contained in Japanese Patent Application No. 2003-055678, filed on Mar. 3, 2003, which is expressly incorporated herein by reference in its entirety.

What is claimed is:

1. An objective lens for converging a beam emitted by a light source on a recording surface of an optical disc, having compatibility with at least two types of optical discs of different data densities by employing diffracting structure having annular zones formed on at least one surface of the objective lens, the surface on which the diffracting structure is formed including:
an inner area which focuses the beam on the recording surface of each optical disc substantially with no aberration both when a first beam of a first wavelength for information recording/readout of a first optical disc is incident thereon and when a second beam of a second wavelength for information recording/readout of a second optical disc having data density higher than that of the first optical disc is incident thereon; and
an outer area which focuses the second beam on the recording surface of the second optical disc substantially with no aberration while forming a wavefront that is substantially continuous with a wavefront of part of the second beam that passed through the inner area,
wherein the outer area includes at least one special annular zone which is formed so that part of the first beam that passed through the special annular zone will be substantially in phase with part of the first beam that passed through the inner area, and wherein a convergence angle θ [deg] of part of the first beam incident on the outermost part of the inner area measured after emerging from the objective lens and a design numerical aperture $NA_{ref}$ as an NA (Numerical Aperture) necessary for the information recording/readout of the first optical disc satisfy:

$0.9 < \sin\theta/NA_{ref} < 1.0$, and wherein an effective NA of the objective lens for the first beam is set substantially equal to the numerical aperture $NA_{ref}$.

2. The objective lens according to claim 1, wherein phase difference φ [deg] between the phase of the part of the first beam that passed through the special annular zone and the phase of the part of the first beam that passed through the inner area satisfies:

$-90° < \phi < +90°$.

3. The objective lens according to claim 2, wherein the phase difference φ further satisfies:

$-60° \leq \phi \leq +60°$.

4. The objective lens according to claim 1, wherein a diameter W1 of a beam spot formed on the recording surface of the first optical disc by the first beam that passed through the objective lens and a beam spot diameter $W_{ref}$ obtained when an objective lens having an NA equal to the design numerical aperture $NA_{ref}$ is used satisfy:

$0.99 < W1/W_{ref} < 1.01$.

5. The objective lens according to claim 1, wherein at least one of the special annular zones satisfies the following condition regarding heights hmin and hmax of innermost and outermost parts of the special annular zone measured from the optical axis of the objective lens and height H of the outermost part of the inner area measured from the optical axis:

$1.1 < (hmin+hmax)/2H < 1.25$.

6. The objective lens according to claim 1, wherein the design numerical aperture $NA_{ref}$ for the first optical disc is 0.50 or more.

7. The objective lens according to claim 1, wherein an NA necessary for the information recording/readout of the second optical disc is 0.62 or more.

8. An objective lens for converging a beam emitted by a light source on a recording surface of an optical disc, having compatibility with at least two types of optical discs of different data densities by employing diffracting structure having annular zones formed on at least one surface of the objective lens, the surface on which the diffracting structure is formed including:

an inner area which focuses the beam on the recording surface of each optical disc substantially with no aberration both when a first beam of a first wavelength suitable for information recording/readout of a first optical disc is incident thereon and when a second beam of a second wavelength suitable for information recording/readout of a second optical disc having data density relatively higher than that of the first optical disc is incident thereon; and an outer area which focuses the second beam on the recording surface of the second optical disc substantially with no aberration while forming a wavefront that is substantially continuous with a wavefront of part of the second beam that passed through the inner area, wherein the objective lens is placed so that the first beam will be incident thereon as a parallel beam, wherein the outer area includes at least one special annular zone which is formed so that part of the first beam that passed through the special annular zone will be substantially in phase with part of the first beam that passed through the inner area, wherein focal length f1 of the objective lens for the first wavelength, height H of the outermost part of the inner area measured from the optical axis of the objective lens, and a design numerical aperture $NA_{ref}$ as an NA (Numerical Aperture) necessary for the information recording/readout of the first optical disc satisfy:

$0.9 < H/(f1 \cdot NA_{ref}) < 1.0$, and wherein an effective NA of the objective lens for the first beam is set substantially equal to the design numerical aperture $NA_{ref}$.

9. The objective lens according to claim 8, wherein phase difference φ [deg] between the phase of the part of the first beam that passed through the special annular zone and the phase of the part of the first beam that passed through the inner area satisfies:

$-90° < \phi < +90°$.

10. The objective lens according to claim 9, wherein the phase difference φ further satisfies:

$-60° \leq \phi \leq +60°$.

11. The objective lens according to claim 8, wherein a diameter W1 of a beam spot formed on the recording surface of the first optical disc by the first beam that passed through the objective lens and a beam spot diameter $W_{ref}$ obtained when an objective lens having an NA equal to the design numerical aperture $NA_{ref}$ is used satisfy:

$0.99 < W1/W_{ref} < 1.01$.

12. The objective lens according to claim 8, wherein at least one of the special annular zones satisfies the following condition regarding heights hmin and hmax of innermost and outermost parts of the special annular zone measured from the optical axis of the objective lens:

$1.1 < (hmin+hmax)/2H < 1.25$.

13. The objective lens according to claim 8, wherein the design numerical aperture $NA_{ref}$ for the first optical disc is 0.50 or more.

14. The objective lens according to claim 8, wherein an NA necessary for the information recording/readout of the second optical disc is 0.62 or more.

* * * * *